US010569619B2

(12) United States Patent
Humburg

(10) Patent No.: US 10,569,619 B2
(45) Date of Patent: Feb. 25, 2020

(54) COMBUSTION CHAMBER ASSEMBLY UNIT FOR A FUEL-OPERATED VEHICLE HEATER

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 105 days.

(21) Appl. No.: 15/704,357

(22) Filed: Sep. 14, 2017

(65) Prior Publication Data

US 2018/0072134 A1 Mar. 15, 2018

(30) Foreign Application Priority Data

Sep. 15, 2016 (DE) .................. 10 2016 117 408

(51) Int. Cl.
*B60H 1/22* (2006.01)
*F23C 9/08* (2006.01)
(Continued)

(52) U.S. Cl.
CPC ............. *B60H 1/22* (2013.01); *F23C 9/00* (2013.01); *F23C 9/006* (2013.01); *F23C 9/08* (2013.01);
(Continued)

(58) Field of Classification Search
CPC ...... B60H 1/22; B60H 1/2209; B60H 1/2212; B60H 2001/2281; F23C 9/00; F23C 9/08;
(Continued)

(56) References Cited

U.S. PATENT DOCUMENTS 2,610,796 A * 9/1952 Marshall, Jr. ........ B60H 1/2209
236/20 R
3,319,692 A * 5/1967 Reba ..................... F23C 9/00
431/116
(Continued)

FOREIGN PATENT DOCUMENTS

DE 2718215 A1 * 11/1978 ........... B60H 1/2212
DE 39 20 078 A1 12/1989
(Continued)

OTHER PUBLICATIONS

"DE_19929465_C1_M—Machine Translation.pdf", machine translation, EPO.org, Mar. 31, 2019.*
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A combustion chamber assembly unit, for a fuel-operated vehicle heater, includes a combustion chamber housing (12) with a combustion chamber (18) defined by a circumferential wall (14) and by a bottom area (16). A flame tube (30) follows the circumferential wall (14) in the direction of a housing longitudinal axis (L) and encloses a waste gas flow space (32) that is open in the direction of the housing longitudinal axis (L). A flame diaphragm (34) has a flow-through opening (60). A waste gas backflow space (46) is formed between the flame tube (30) and a housing (38) enclosing same. The waste gas flow space (32) is open towards the waste gas backflow space (46) in a first axial end area (48) of the waste gas backflow space (46). A catalytic converter device (54), through which combustion waste gases can flow, is provided in the waste gas backflow space (46).

20 Claims, 2 Drawing Sheets

(51) Int. Cl.
*F23G 7/07* (2006.01)
*F23D 3/40* (2006.01)
*F23C 9/00* (2006.01)
*F23J 15/02* (2006.01)

(52) U.S. Cl.
CPC ............ *F23D 3/40* (2013.01); *F23G 7/07* (2013.01); *F23J 15/02* (2013.01); *B60H 1/2209* (2013.01); *B60H 1/2212* (2013.01); *B60H 2001/2281* (2013.01); *F23D 2900/21002* (2013.01); *F23J 2215/40* (2013.01)

(58) Field of Classification Search
CPC .. F23C 9/006; F23D 3/40; F23D 2900/21002; F23G 7/07; F23J 15/02; F23J 2215/40
USPC .................................................... 237/12.3 C
See application file for complete search history.

(56) References Cited

U.S. PATENT DOCUMENTS

| | | | | |
|---|---|---|---|---|
| 3,869,244 | A * | 3/1975 | Von Linde | F23C 7/06 431/116 |
| 3,989,029 | A * | 11/1976 | Friedl | B60H 1/22 126/110 B |
| 4,004,875 | A * | 1/1977 | Zink | F23C 7/00 431/9 |
| 4,718,602 | A * | 1/1988 | Beck | F23D 11/001 126/110 B |
| 4,923,033 | A | 5/1990 | Panick et al. | |
| 5,350,293 | A * | 9/1994 | Khinkis | F23C 6/045 431/116 |
| 5,366,151 | A * | 11/1994 | King | B60H 1/2206 237/12.3 C |
| 5,423,674 | A * | 6/1995 | Knopfel | F23C 7/002 431/115 |
| 5,653,387 | A * | 8/1997 | Takayanagi | B60H 1/2212 237/12.3 C |
| 5,813,848 | A * | 9/1998 | Loqvist | F23C 7/06 431/116 |
| 6,062,848 | A * | 5/2000 | Lifshits | F23C 6/045 239/407 |
| 6,712,283 | B2 * | 3/2004 | Humburg | B60H 1/2209 165/41 |
| 2003/0132304 | A1* | 7/2003 | Humburg | B60H 1/2209 237/12.3 C |
| 2007/0154855 | A1* | 7/2007 | Gibson | F23C 9/006 431/9 |
| 2014/0260305 | A1* | 9/2014 | Hobbs | F23R 3/12 60/776 |
| 2018/0180283 | A1* | 6/2018 | Dell | F23D 3/40 |

FOREIGN PATENT DOCUMENTS

| | | | |
|---|---|---|---|
| DE | 39 19 797 A1 | 1/1991 | |
| DE | 41 18 864 A1 | 12/1992 | |
| DE | 42 32 181 A1 | 3/1994 | |
| DE | 4401800 C1 * | 3/1995 | ............... F23D 3/40 |
| DE | 4433210 A1 * | 3/1996 | ........... B60H 1/2206 |
| DE | 19546131 C1 * | 11/1996 | ........... B60H 1/2203 |
| DE | 19926264 A1 * | 12/2000 | ............. F24H 3/065 |
| DE | 299 12 362 U1 | 1/2001 | |
| DE | 19929465 C1 * | 3/2001 | ............. F24H 1/263 |
| DE | 103 46 558 B3 | 3/2005 | |
| DE | 103 43 282 B3 | 4/2005 | |
| DE | 102005001662 A1 * | 7/2006 | ............. F24H 3/065 |
| DE | 10 2008 002956 A1 | 2/2010 | |
| DE | 102009046781 A1 * | 5/2011 | ........... B60H 1/2209 |
| DE | 10 2014 103817 A1 | 9/2015 | |
| EP | 0 287 923 A2 | 10/1988 | |
| EP | 0 638 776 A1 | 2/1995 | |
| EP | 1327542 A1 | 7/2003 | |
| FR | 2593123 A1 * | 7/1987 | ............... F24H 9/20 |
| GB | 1481752 A * | 8/1977 | ........... B60H 1/2212 |
| JP | 61188216 A * | 8/1986 | |
| JP | 02208405 A * | 8/1990 | |
| JP | 03070939 A * | 3/1991 | |
| JP | H09118125 A | 5/1997 | |
| JP | H09226354 A | 9/1997 | |
| JP | 2001330212 A | 11/2001 | |

OTHER PUBLICATIONS

"DE_102014103817_A1_M—Machine Translation.pdf", machine translation, EPO.org, Mar. 31, 2019.*
"EP_0638776_A1_M—Machine Translation.pdf", machine translation, EPO.org, Mar. 31, 2019.*
CN-102080874-A. (Year: 2011).*
CN-200982741-Y. (Year: 2007).*
CN-201297768-Y. (Year: 2009).*

* cited by examiner

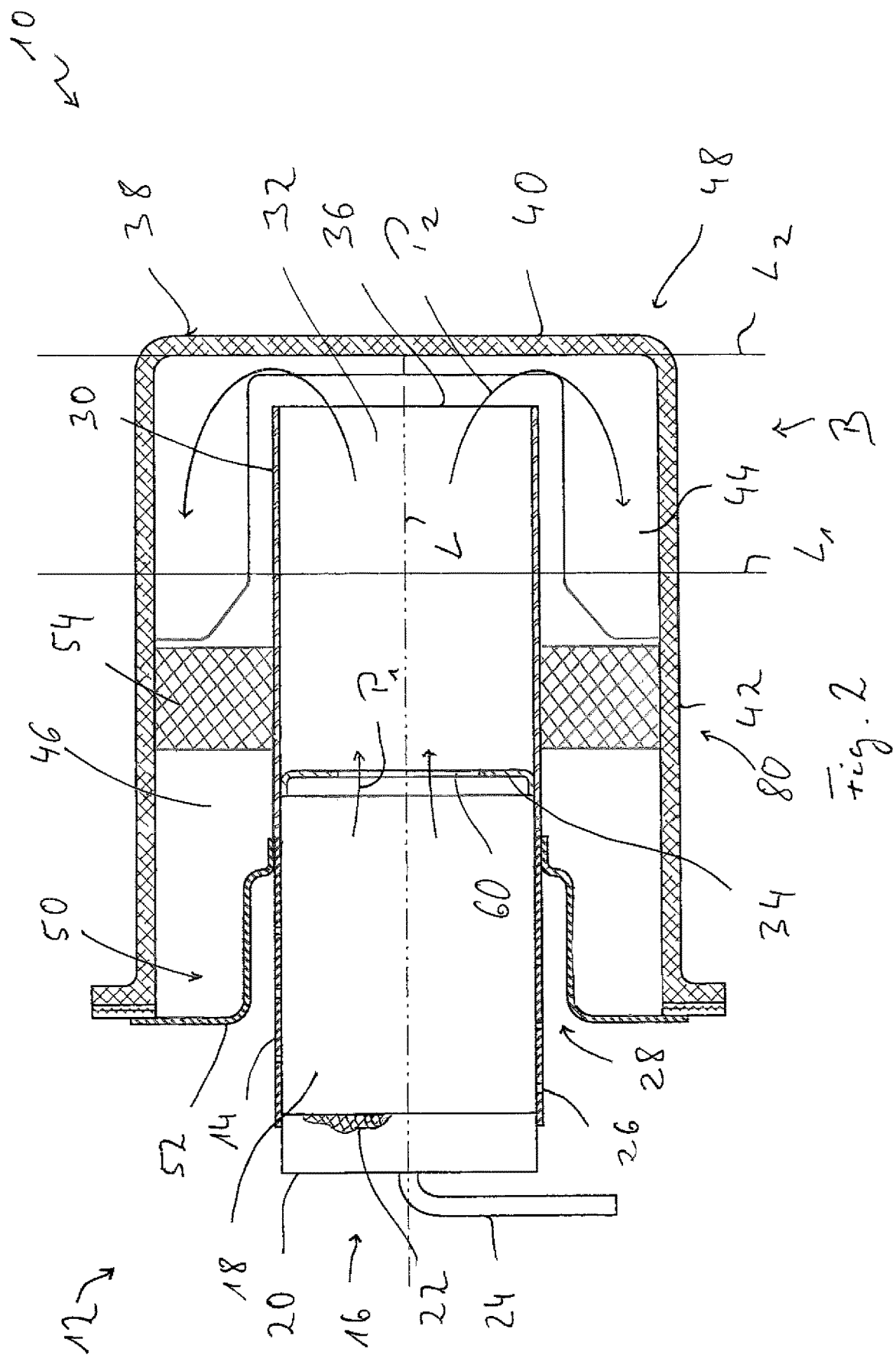

COMBUSTION CHAMBER ASSEMBLY UNIT FOR A FUEL-OPERATED VEHICLE HEATER

CROSS REFERENCE TO RELATED APPLICATIONS

This application claims the benefit of priority under 35 U.S.C. § 119 of German Application 10 2016 117 408.4, filed Sep. 15, 2016, the entire contents of which are incorporated herein by reference.

FIELD OF THE INVENTION

The present invention pertains to a combustion chamber assembly unit for a fuel-operated vehicle heater, which heater can be used in a vehicle, for example, as a parking heater or as an auxiliary heater.

BACKGROUND OF THE INVENTION

A combustion chamber assembly unit for a fuel-operated vehicle heater, in which a combustion chamber defined by a bottom area and by a circumferential wall passes over in the area of a flame diaphragm into a waste gas flow space enclosed by a flame tube, is known from DE 103 46 558 B3. The waste gas flow space is axially open at an axial end of the flame tube and the combustion waste gases being released in this area from the flame tube enter a waste gas backflow space formed between the flame tube and a housing enclosing the flame tube. The combustion waste gases transfer heat to a heat carrier medium flowing past the housing on the side thereof facing away from the flame tube, for example, to the air to be introduced into an interior of a vehicle, or to the cooling liquid circulating in a coolant circuit of an internal combustion engine.

SUMMARY OF THE INVENTION

An object of the present invention is to provide a combustion chamber assembly unit for a fuel-operated vehicle heater, which combustion chamber assembly unit can be operated with reduced pollutant emission.

This object is accomplished according to the present invention by a combustion chamber assembly unit for a fuel-operated vehicle heater, comprising a combustion chamber housing with a combustion chamber defined by a circumferential wall and by a bottom area, a flame tube. which follows the circumferential wall in the direction of a housing longitudinal axis and encloses a waste gas flow space that is open in the direction of the housing longitudinal axis, and a flame diaphragm with a flow-through opening, wherein a waste gas backflow space is formed between the flame tube and a housing enclosing same.

Provisions are further made for the waste gas flow space to be open towards the waste gas backflow space in a first axial end area of the waste gas backflow space, and a catalytic converter device, through which combustion waste gases flowing in the waste gas backflow space can flow, is provided in the waste gas backflow space.

This catalytic converter device may be effective especially for reducing the percentage of CO and of HC in the combustion waste gases and leads to a compact configuration due to being integrated in the area of the combustion chamber assembly unit.

According to another aspect of the present invention, which may also be combined in conjunction with the above-described configuration, it is proposed that a waste gas return opening device be provided in the axial area of the flame tube for returning combustion waste gases flowing in the waste gas backflow space into the combustion chamber or/and into the gas flow space.

Due to a part of the combustion waste gases flowing in the waste gas backflow space being returned in the direction of the combustion chamber or to the waste gas flow space, i.e., into the combustion process taking place, the pollutant emission, especially the NOx content in the combustion waste gases, can be markedly lowered.

It is proposed for an efficient return of combustion waste gases flowing in the waste gas backflow space into the combustion process that the flame diaphragm define a waste gas transfer space together with the flame tube or/and with the circumferential wall, and that the waste gas return opening device comprise at least one first waste gas return opening connecting the waste gas backflow space with the waste gas transfer space and at least one second waste gas return opening connecting the waste gas transfer space with the combustion chamber or/and with the waste gas flow space.

A comparatively large quantity of combustion gases flowing in the waste gas backflow space can now be fed back if the waste gas return opening device comprises a plurality of first waste gas return openings arranged in the circumferential direction preferably in a ring-like manner or/and a plurality of second waste gas return openings following each other preferably in a ring-like manner in the circumferential direction. Provisions may further be made for at least one and preferably each first waste gas return opening to be offset axially in relation to at least one and preferably each second waste gas return opening.

According to an especially advantageous embodiment aspect, provisions may be made in the combustion chamber assembly unit configured according to the present invention for the flow-through opening to have a flow cross section area decreasing towards a vertex area. A nozzle effect, which generates a vacuum in the waste gas transfer space and thus suctions combustion waste gases collected therein into the combination process, can be generated in this manner.

To make it possible to provide this flow cross section area decreasing in the direction in which the combustion waste gases flow, i.e., in the direction from the combustion chamber to the waste gas flow space, in a simple manner, it is proposed that the flame diaphragm be connected in an upstream connection area to the circumferential wall or/and to the flame tube and that it be connected to the circumferential wall or/and to the flame tube in a downstream connection area, and to have a flow guide wall radially defining the flow-through opening between the upstream connection area and the downstream connection area, and that the flow cross section area decrease towards the vertex area starting from the first connection area.

The aforementioned nozzle effect can be utilized especially efficiently if provisions are made according to another advantageous aspect for a rate of change in the flow cross section area to decrease in at least some areas between the upstream connection area and the vertex area in the direction of the housing longitudinal axis. The flame diaphragm is thus configured in the manner of a venturi nozzle having an advantageous effect for the flow conditions.

To make it possible to utilize the vacuum effect or the suction effect as efficiently as possible, provisions may be made for at least one and preferably every other waste gas return opening to be provided in the area of the vertex area.

The flame diaphragm may have an essentially stepwise expansion of the waste gas flow space downstream of the vertex area for an even more improved flow guidance or waste gas return.

The catalytic converter device may be arranged in a second axial end area of the waste gas backflow space, but it may also be positioned, as an alternative, in a central longitudinal area or in any other length area of the waste gas backflow space.

Provisions may be made, for example, for a combustion air feed space enclosing the circumferential wall to be open towards the combustion chamber via a plurality of combustion air feed openings provided in the circumferential wall, and for a partition separating the combustion air feed space from the waste gas backflow space to be provided, wherein the catalytic converter device is arranged such that it encloses the partition or/and axially adjoins the partition. The heat of reaction generated in the catalytic process can be transferred in this manner to the combustion air to be introduced into the combustion chamber, so that this enters the combustion chamber in a preheated state. This also contributes to the cooling of the catalytic converter device.

A further improved utilization of the heat generated in the catalytic converter device as well as an efficient cooling of the catalytic converter device can be achieved if the catalytic converter device is arranged between the partition and the housing.

The combustion chamber assembly unit configured according to the present invention may be configured such that the bottom area comprises an evaporator medium carrier and an evaporator medium, which is porous on a side of the evaporator medium carrier facing the combustion chamber, or/and that the housing is an essentially drop-shaped heat exchanger housing with a bottom wall located axially opposite the flame tube and with a heat exchanger housing circumferential wall enclosing the flame tube and defining the waste gas backflow space radially outwardly.

The present invention further pertains to a vehicle heater, comprising a combustion chamber assembly unit configured according to the present invention.

The present invention will be described in detail below with reference to the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a longitudinal sectional view of a fuel-operated combustion chamber assembly unit for a vehicle heater according to an alternative embodiment.

DESCRIPTION OF THE PREFERRED EMBODIMENTS

Figure 1:
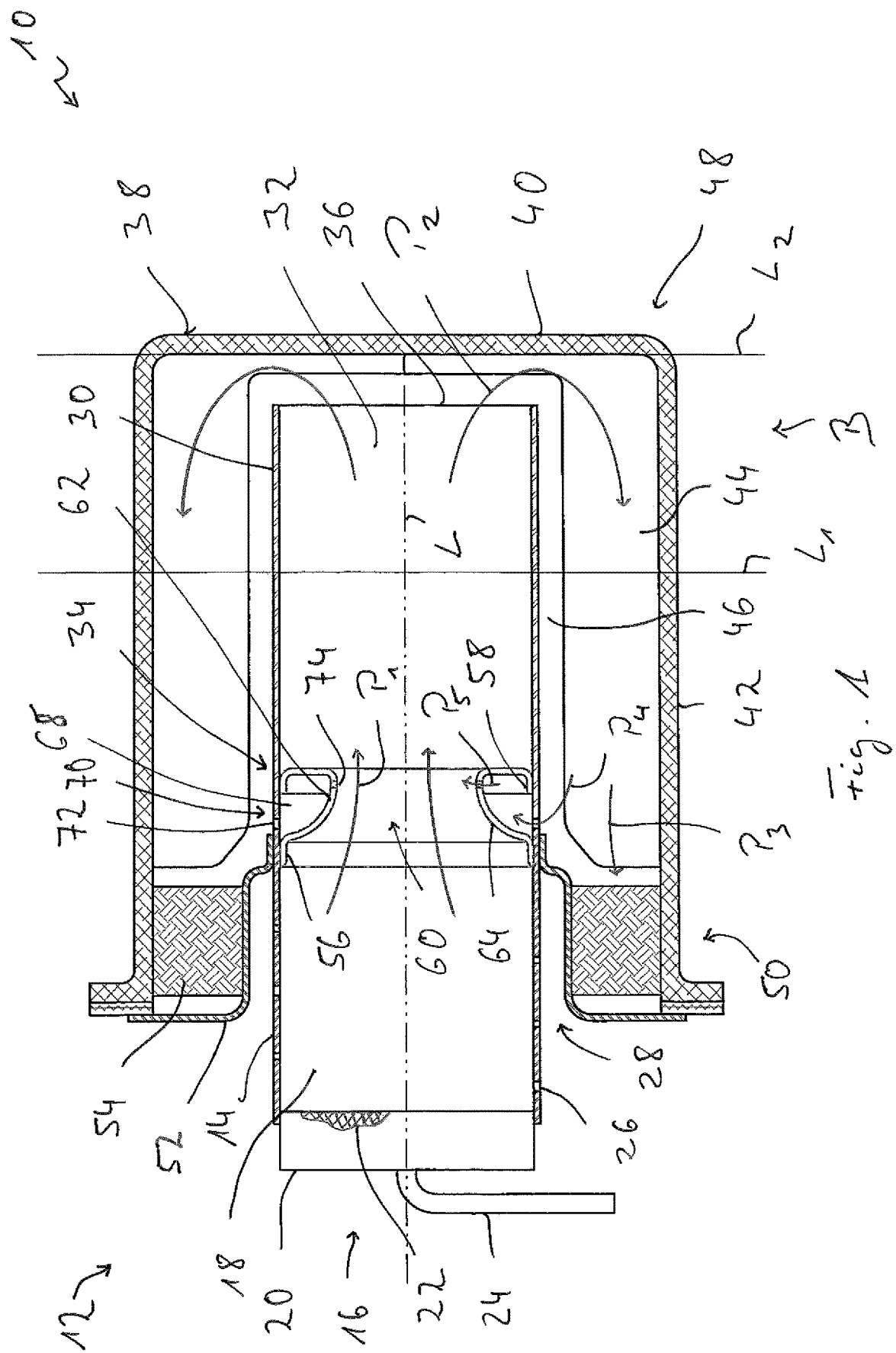
FIG. 1 is a longitudinal sectional view of a fuel-operated combustion chamber assembly unit for a vehicle heater.

Referring to the drawings, the combustion chamber assembly unit 10 shown in FIG. 1 comprises a combustion chamber housing generally designated by 12. With a circumferential wall 14 and with a bottom area 16, the combustion chamber housing 12 encloses a combustion chamber 18. The bottom area 16 may be built with an evaporator medium carrier 20 having, for example, a pot-shaped configuration and with a porous evaporator medium 22 carried on the side of said evaporator medium carrier facing the combustion chamber 18. Liquid fuel fed by a fuel feed device, for example, feed pump, is fed into the porous evaporator medium 22 via a fuel feed line 24 and evaporated from this evaporator medium 22 in the direction of the combustion chamber 18. To support the evaporation of the fuel especially during the start phase of the combustion operation, a bottom area 16 may comprise an electrically energizable heating device on the side of the porous evaporator medium 22 or/and of the evaporator medium carrier 20 facing away from the combustion chamber 18.

To feed combustion air into the combustion chamber 18, the circumferential wall 14 has a plurality of combustion air feed openings 26. A combustion air feed space 28 enclosing the circumferential wall 14 or the combustion chamber 18 preferably in a ring-like manner is open towards the combustion chamber 18 via these combustion air feed openings 26. The air necessary for the combustion can be delivered in the direction of the combustion air feed space 28 by a combustion air feed device, not shown, for example, a side channel blower.

A flame tube 30, which is made integrally in one piece with the circumferential wall 14 in the exemplary embodiment shown, adjoins the circumferential wall 14 in the direction of a housing longitudinal axis L. A waste gas flow space 32, into which the combustion waste gases leaving the combustion chamber 18 in the area of a flame diaphragm generally designated by 34 enter, as is indicated by flow arrows $P_1$, is formed in the interior of the flame tube 30. It should be noted that in the sense of the present invention, the combustion waste gases flowing from the combustion chamber 18 into the waste gas flow space 32 essentially in the direction of the housing longitudinal axis L define in this area of the combustion chamber assembly unit 10 a flow direction and, relative to this flow direction, system areas positioned upstream and downstream.

The waste gas flow space 32 is open at an axial end area of the flame tube 30 located at a distance from the circumferential wall 14. The flame tube 30 or the combustion chamber housing 12 is enclosed by a pot-shaped housing 38, which has a bottom wall 40 located opposite the axial end area 36 of the flame tube 30 and a heat exchanger housing circumferential wall 42 enclosing the flame tube 30 and in some areas also the circumferential wall 14 radially on the outside. The housing 38 may be the interior of pot-shaped heat exchanger housings inserted one into another, which define between them a flow space for a liquid heat carrier medium. If the combustion chamber assembly unit 10 is used in conjunction with an air heater, the air to be heated may flow past the housing 38 on an outer side of the housing 38 facing away from the flame tube 30. To improve the heat transfer from the combustion waste gases to the housing 38, said housing may have heat transfer ribs 44 on its inner side facing the flame tube 30 in the area of the bottom wall 40 or/and in the area of the heat exchanger housing circumferential wall 42.

The combustion waste gases leaving the waste gas flow space 32 at the axial end area 36 of the flame tube 30 are axially deflected, as is indicated by flow arrows $P_2$, at the bottom wall 40 and thus they enter a waste gas backflow space 46 in the area of the first axial end area 48 thereof. As is indicated by a flow arrow $P_3$, the combustion waste gases flow in the direction of a second axial end area 50 of the waste gas backflow space 46. This second axial end area 50 of the waste gas backflow space 46 may be positioned such that it axially overlaps the combustion chamber 18 or the circumferential wall 14 in at least some areas. The waste gases flowing through the waste gas backflow space 46 can leave the waste gas backflow space 46 in the second axial end area via a waste gas outlet, not shown, for example, in the partition 52 or in the circumferential wall 42 of the pot-shaped housing 38.

The waste gas backflow space 46 is defined in the second axial end area 50 radially inwardly and in the axial direction by a partition 52 connected on the outside to the circumferential wall 14 or to the flame tube 30. The partition 52 thus separates the waste gas backflow space 46 from the combustion air feed space 28 in this second axial end area 50.

A catalytic converter device 54 having, for example, a ring-like configuration, especially an oxidation catalytic converter device, may be held in this area of the waste gas backflow space 46 under a slight press fit between the partition 52 and the heat exchanger housing circumferential wall 42. The catalytic converter device 54 may have, for example, a stainless steel mesh coated with catalytic material. The combustion waste gases flowing through the waste gas backflow space 46 or at least part of these combustion waste gases flow through the catalytic converter device 54, so that CO and HC contained in the combustion waste gases react to form $CO_2$ and $H_2O$ during the reaction taking place on the surface of the catalytic material, so that the pollutant emission is lowered. After flowing through the catalytic converter device 54, the combustion waste gases leave the waste gas backflow space 46, for example, axially in the area of an opening provided in the partition 52 towards a waste gas guiding system.

Part of the heat generated during the catalytic reaction can be transferred, on the one hand, to the combustion air flowing in the combustion air feed space 28 in the direction of the combustion chamber 18 in order to preheat this air. Another part of the heat of reaction may be transferred to the heat exchanger housing circumferential wall 42 and via this to the heat carrier medium to be heated. In this manner, the catalytic converter device 54 is cooled and protected from overheating, on the one hand, and the heat generated in the catalytic reaction is efficiently utilized, on the other hand.

The flame diaphragm, defining essentially an area of the transition from the combustion chamber 18 to the waste gas flow space 32, is connected to the circumferential wall 14 and to the flame tube 30 with two connection areas 56, 58 located offset in relation to one another in the direction of the housing longitudinal axis L. Starting from the upstream connection area 56 located facing the combustion chamber 18, a flow-through opening 60 formed in the flame diaphragm 34 tapers to a minimum flow cross-sectional area provided in the area of a vertex area 62 of the flame diaphragm 34. The flame diaphragm 34 provides a flow guide wall 64 in the area between the upstream connection area 56 and the vertex area 62. This flow guide wall 64 has a convex curvature, so that the rate of change of the flow cross-sectional area decreases between the upstream connection area 56 and the vertex area 62. The decrease in the flow cross-sectional area relative to a length unit in the direction of the housing longitudinal axis L has a maximum in the area of the flow guide wall 64, which area adjoins the upstream connection area 56. The rate of change is minimal or equals zero in the area of the vertex area 62.

Adjoining the vertex area 62, the flame diaphragm 34 provides a stepwise expansion of the flow cross-sectional area in the transition to the flame tube 30.

The flame diaphragm 34, configured with its above-described geometry in the manner of a venturi nozzle, defines, together with the area of the circumferential wall 14 or of the flame tube 30 enclosing this flame diaphragm 34, a waste gas transfer space 68 enclosing the housing longitudinal axis L preferably without interruptions and in a ring-like manner (ring-shaped). A waste gas return opening device 70 comprises in the circumferential wall 14 or in the flame tube 30, i.e., basically in a wall defining the waste gas transfer space 68 radially outwardly, a plurality of first waste gas return openings 72 arranged following each other in the circumferential direction preferably in a ring-like structure. The waste gas backflow space 46 is open towards the waste gas transfer space 68 via the first waste gas return openings 72. The waste gas return opening device 70 further comprises a plurality of second waste gas return openings 74 in the flame diaphragm 34, especially in the vertex area 62 thereof, which said waste gas return openings 74 are arranged following each other in the circumferential direction preferably in a ring-like structure. The waste gas transfer space 68 is open towards the combustion chamber 18 or towards the waste gas flow space 32, especially in a transition area from the combustion chamber 18 to the waste gas flow space 32, via the second waste gas return openings 74 arranged offset in the direction of the housing longitudinal axis L in relation to the first waste gas return openings 72. The waste gas transfer space 68 thus provides a connection between the waste gas backflow space 46 and the combustion chamber 18 or the waste gas flow space 32 via the waste gas return opening device 70.

During combustion taking place essentially in the combustion chamber 18, the combustion waste gases flow through the flow-through opening 60. Based on the decreasing flow cross-sectional area and on the venturi effect thus generated, a vacuum builds up in relation to the waste gas transfer space 68. This means that combustion waste gases suctioned via the first waste gas return openings 72 into the waste gas transfer space 68 reach, as is indicated by flow arrows $P_4$ and $P_5$, the area of the combustion chamber 18 and the area of the waste gas flow space 32 and are thus fed back into the combustion process. The pollutant emission, especially the percentage of NOx in the combustion waste gases, can be markedly reduced by this feedback. The circumstance that the majority of the heat being transported in the combustion waste gases is transferred via the housing 38 to the heat carrier medium close to the first axial end area 48 of the waste gas backflow space 46 makes essentially a considerable contribution to this. About 80% of the heat to be transferred is transferred to the housing 38 and hence to the heat carrier medium in an axial area B defined between two lines L1, L2, which area comprises about ⅓ of the axial extension of the waste gas backflow space 46. The combustion waste gases are thus already cooled markedly in the area of the waste gas return opening device 70, so that the feedback of these waste gases into the combustion process contributes to a reduced percentage of NOx in the combustion waste gases based on the reduction of the combustion temperature, which is brought about thereby.

It is possible to achieve with the combustion chamber assembly unit 10 configured according to the present invention both a feedback of combustion waste gases into the combustion process, which feedback is forced based on the special geometry of the flame diaphragm 34, and a markedly reduced pollutant emission due to the flow through a catalytic converter device prior to the release of the combustion waste gases from the combustion chamber assembly unit 10. These two actions are advantageously provided in conjunction with one another in the combustion chamber assembly unit 10. However, each of the actions can also bring about a reduced percentage of pollutants in the waste gases emitted from the combustion chamber assembly unit 10 alone in itself, without the other action being necessarily taken.

FIG. 2 shows an alternative type of embodiment of a combustion chamber assembly unit 10, whose basic configuration corresponds essentially to the configuration described above with reference to FIG. 1. Reference may be made in this connection to the above explanations.

FIG. 2 shows that the catalytic converter device 54 is arranged in a central longitudinal area 80 of the waste gas backflow space 46. The catalytic converter device 54 is thus located upstream of the positioning of the flame diaphragm 34 in the waste gas flow space 32 relative to the flow direction of the waste gas in the waste gas backflow space 46. To make such a positioning of the catalytic converter device 54 possible, for example, the heat transfer ribs 44 provided on the pot-shaped housing 38 may be made axially shorter than in the exemplary embodiment shown in FIG. 1. The catalytic converter device 54 may be held, for example, under a slight radial press fit between the circumferential wall 42 of the pot-shaped housing 38 and the flame tube 30.

It should be pointed out in connection with this positioning of the catalytic converter device 54 that the central longitudinal area 80 of the waste gas backflow space 46 may comprise, for example, starting from the first axial end area 48 or the bottom wall 40 of the pot-shaped housing 38, a length area corresponding to about 30% to about 70% and preferably to about 40% to about 60% of the entire length of the axial extension of the waste gas backflow space 46.

For example, no openings allowing the return of waste gases into the combustion process are provided in the flame tube 30 or the circumferential wall 14 in the type of embodiment of a combustion chamber assembly unit 10 shown in FIG. 2. The flame diaphragm 34 may therefore have a conventional configuration and be provided, for example, by an essentially planar sheet metal part, which is curved axially in its outer circumferential area and is connected to the inner circumferential surface of the flame tube 30 or of the circumferential wall 14.

The design embodiment aspects shown on the basis of the embodiment according to FIG. 1 and permitting the return of a part of the waste gas flowing in the waste gas backflow space 46 into the waste gas flow space 32 or into the combustion process may, of course, also be provided in this type of embodiment. It should be noted that the catalytic converter device 54 may also be provided in another position, for example, at or close to the first axial end area 48, especially if this is advantageous for thermal reasons for carrying out the catalytic reaction. The pot-shaped housing 38 could have a two-part configuration and comprise a circumferential wall with heat transfer ribs provided thereon and a separately configured bottom wall in this case. The catalytic converter device 54 in this case could first be inserted into the space enclosed by the circumferential wall adjoining the heat transfer ribs, after which the bottom wall is installed in order to provide the pot-shaped structure of the housing 38.

It is finally noted that the above-described combustion chamber assembly unit may be varied in many different aspects, without deviating from the principles of the present invention. For example, the flame diaphragm could thus be made integrally in one piece with the circumferential wall enclosing the combustion chamber or/and it could be made integrally in one piece with the flame tube axially following this circumferential wall. It is also not absolutely necessary to provide the circumferential wall and the flame tube by a single component as integral components thereof. For example, the flame tube thus also could be configured integrally with the partition. The flame diaphragm also could be configured integrally with the partition. The flame diaphragm also could be provided as an integral component of the partition, while the circumferential wall and the flame tube are provided as separate components. The connection of the flame diaphragm, for example, to the flame tube or the circumferential wall consequently comprises in the sense of the present invention both the connection of two separate components, for example, by connection in substance, and the integral provision of two system areas, for example, flame diaphragm and circumferential wall, as parts of a component.

While specific embodiments of the invention have been shown and described in detail to illustrate the application of the principles of the invention, it will be understood that the invention may be embodied otherwise without departing from such principles.

What is claimed is:

1. A combustion chamber assembly unit for a fuel-operated vehicle heater, the combustion chamber assembly unit comprising:
   a combustion chamber housing with a combustion chamber defined by a circumferential wall and by a bottom area;
   a flame tube, which follows the circumferential wall in a direction of a housing longitudinal axis and encloses a waste gas flow space, that is open in the direction of the housing longitudinal axis;
   a housing enclosing the flame tube;
   a flame diaphragm with a flow-through opening, waste gas exiting the combustion chamber towards the waste gas flow space via the flame diaphragm, wherein a waste gas backflow space is formed between the flame tube and the housing enclosing the flame tube and is open towards the waste gas backflow space in an axial end area of the waste gas backflow space; and
   a waste gas return opening device, in an axial area of the flame diaphragm, for returning combustion waste gases flowing in the waste gas backflow space into the combustion chamber or into the waste gas flow space or into both the combustion chamber and into the waste gas flow space.

2. A combustion chamber assembly unit in accordance with claim 1, wherein:
   the flame diaphragm defines a waste gas transfer space together with the flame tube or with the circumferential wall or together with both the flame tube and the circumferential wall; and
   the waste gas return opening device comprises at least one first waste gas return opening connecting the waste gas backflow space to the waste gas transfer space and at least one second waste gas return opening connecting the waste gas transfer space to the combustion chamber or to the waste gas flow space or to both the combustion chamber and the waste gas flow space.

3. A combustion chamber assembly unit in accordance with claim 2, wherein:
   the waste gas return opening device comprises a plurality of first waste gas return openings arranged following each other in a circumferential direction and a plurality of second waste gas return openings arranged following each other in the circumferential direction; and
   each first waste gas return opening is offset axially in relation to at least one second waste gas return opening.

4. A combustion chamber assembly unit in accordance with claim 1, wherein the flow-through opening has a flow cross-sectional area decreasing in a waste gas flow direction towards a vertex area.

5. A combustion chamber assembly unit in accordance with claim 4, wherein:
the flame diaphragm is connected, in an upstream connection area, to the circumferential wall or to the flame tube or to both the circumferential wall and the flame tube;
the flame diaphragm is connected, in a downstream connection area, to the circumferential wall or to the flame tube or to both the circumferential wall and the flame tube;
the flame diaphragm has a flow guide wall radially defining the flow-through opening between the upstream connection area and the downstream connection area; and
starting from the upstream connection area, the flow cross-sectional area decreases towards the vertex area.

6. A combustion chamber assembly unit in accordance with claim 5, wherein a rate of change in the flow cross-sectional area between the upstream connection area and the vertex area decreases in at least some areas in the direction of the housing longitudinal axis.

7. A combustion chamber assembly unit in accordance with claim 4, wherein:
the waste gas return opening device comprises a plurality of first waste gas return openings arranged following each other in a circumferential direction and a plurality of second waste gas return openings arranged following each other in the circumferential direction;
each first waste gas return opening is offset axially in relation to at least one second waste gas return opening; and
at least one waste gas return opening is provided in an area of the vertex area.

8. A combustion chamber assembly unit in accordance with claim 4, wherein the flame diaphragm provides an essentially stepwise expansion of the waste gas flow space downstream of the vertex area.

9. A combustion chamber assembly unit in accordance with claim 1, wherein:
the bottom area comprises an evaporator medium carrier and an evaporator medium, which is porous on a side of the evaporator medium carrier facing the combustion chamber; or
the housing enclosing the flame tube is an essentially pot-shaped heat exchanger housing with a bottom wall located axially opposite the flame tube and with a heat exchanger housing circumferential wall enclosing the flame tube and radially outwardly of the flame tube defining the waste gas backflow space.

10. A combustion chamber assembly unit in accordance with claim 1, further comprising a catalytic converter device, through which combustion waste gases flowing in the waste gas backflow space can flow, provided in the waste gas backflow space.

11. A combustion chamber assembly unit in accordance with claim 10, wherein the catalytic converter device is provided in another axial end area of the waste gas backflow space.

12. A combustion chamber assembly unit in accordance with claim 10, wherein the catalytic converter device is arranged in a central longitudinal area of the waste gas backflow space.

13. A combustion chamber assembly unit in accordance with claim 10, further comprising a partition, wherein:
a plurality of combustion air feed openings are provided in the circumferential wall;
a combustion air feed space, enclosing the circumferential wall, is open towards the combustion chamber via the plurality of combustion air feed openings;
the partition separates the combustion air feed space from the waste gas backflow space; and
the catalytic converter device is arranged such that catalytic converter device encloses the partition or axially adjoins the partition or both encloses the partition and axially adjoins the partition.

14. A combustion chamber assembly unit in accordance with claim 13, wherein the catalytic converter device is arranged between the partition and the housing.

15. A vehicle heater comprising a combustion chamber assembly unit comprising:
a combustion chamber housing with a combustion chamber defined by a circumferential wall and by a bottom area;
a flame tube, which follows the circumferential wall in a direction of a housing longitudinal axis and encloses a waste gas flow space, that is open in the direction of the housing longitudinal axis;
a housing enclosing the flame tube;
a flame diaphragm with a flow-through opening, waste gas exiting the combustion chamber towards the waste gas flow space via the flame diaphragm, wherein a waste gas backflow space is formed between the flame tube and the housing enclosing the flame tube and is open towards the waste gas backflow space in an axial end area of the waste gas backflow space; and
a waste gas return opening device, in an axial area of the flame diaphragm, for returning combustion waste gases flowing in the waste gas backflow space into the combustion chamber or into the waste gas flow space or into both the combustion chamber and into the waste gas flow space.

16. A vehicle heater in accordance with claim 15, wherein:
the flame diaphragm defines a waste gas transfer space together with the flame tube or with the circumferential wall or together with both the flame tube and the circumferential wall and
the waste gas return opening device comprises at least one first waste gas return opening connecting the waste gas backflow space to the waste gas transfer space and at least one second waste gas return opening connecting the waste gas transfer space to the combustion chamber or to the waste gas flow space or to both the combustion chamber and the waste gas flow space.

17. A vehicle heater in accordance with claim 16, wherein:
the waste gas return opening device comprises a plurality of first waste gas return openings arranged following each other in a circumferential direction and a plurality of second waste gas return openings arranged following each other in the circumferential direction; and
each first waste gas return opening is offset axially in relation to at least one second waste gas return opening.

18. A vehicle heater in accordance with claim 15, further comprising a catalytic converter device, through which combustion waste gases flowing in the waste gas backflow space can flow, provided in the waste gas backflow space.

19. A vehicle heater in accordance with claim 18, further comprising a partition, wherein:
- a plurality of combustion air feed openings are provided in the circumferential wall;
- a combustion air feed space, enclosing the circumferential wall, is open towards the combustion chamber via the plurality of combustion air feed openings;
- the partition separates the combustion air feed space from the waste gas backflow space;
- the catalytic converter device is arranged such that catalytic converter device encloses the partition or axially adjoins the partition or both encloses the partition and axially adjoins the partition; and
- the catalytic converter device is arranged between the partition and the housing.

20. A combustion chamber assembly unit for a fuel-operated vehicle heater, the combustion chamber assembly unit comprising:
- a combustion chamber housing with a combustion chamber defined by a circumferential wall and by a bottom area;
- a flame tube, which follows the circumferential wall in a direction of a housing longitudinal axis and encloses a waste gas flow space, that is open in the direction of the housing longitudinal axis;
- a housing enclosing the flame tube, wherein a waste gas backflow space is formed between the flame tube and the housing enclosing the flame tube and is open towards the waste gas backflow space in an axial end area of the waste gas backflow space;
- a flame diaphragm with a flow-through opening, the flame diaphragm defining a combustion chamber to flame tube transition space, wherein the combustion chamber transitions to the waste gas flow space enclosed by the flame tube and waste gas exits the combustion chamber towards the waste gas flow space via the flow-through opening of the flame diaphragm; and
- a waste gas return opening device, in an axial area of the flame diaphragm, for returning combustion waste gases flowing in the waste gas backflow space into the combustion chamber to flame tube transition space.

* * * * *